Nov. 25, 1969  R. E. ALLEN  3,480,421

METHOD OF MAKING CAPACITORS

Filed Sept. 22, 1965  2 Sheets-Sheet 1

INVENTOR.
Richard E. Allen

BY *Walter S. Zebrowski*

ATTORNEY

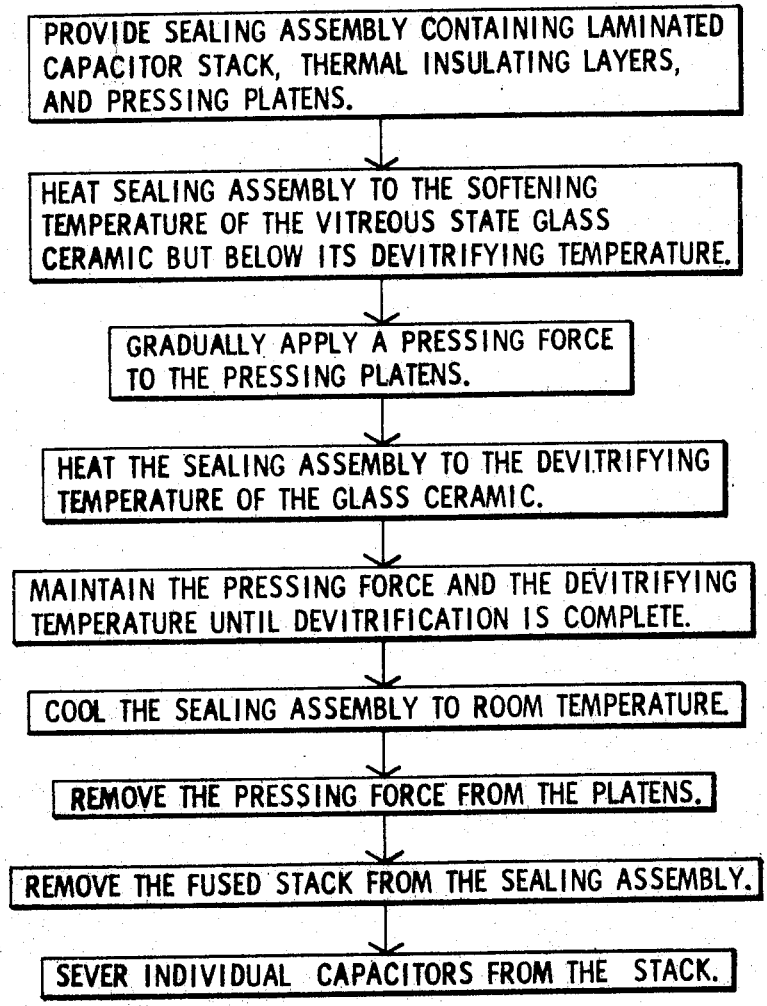

United States Patent Office 3,480,421
Patented Nov. 25, 1969

3,480,421
METHOD OF MAKING CAPACITORS
Richard E. Allen, Corning, N.Y., assignor to Corning Glass Works, Corning, N.Y., a corporation of New York
Filed Sept. 22, 1965, Ser. No. 489,330
Int. Cl. C03b 29/00; C03c 27/00
U.S. Cl. 65—33                                   6 Claims

ABSTRACT OF THE DISCLOSURE

A method of making small laminated capacitors, the resultant product comprising alternate layers of deritrified state glass ceramic and metal foil. The method includes the steps of stacking metal foil electrodes and vitreous state glass ceramic strips, heating the stacked assembly to the softening temperature of the vitreous state glass ceramic but below the deritrifying temperature thereof, applying pressure, and thereafter heating to a devitrifying temperature while maintaining pressure for a time sufficient to achieve the desired amount of devitrification. The assembly is advantageously cooled at a controlled rate to improve the T.V.C. characteristic thereof.

---

The present invention relates to a new and useful method for making small laminated capacitors of the type comprising alternate strips of dielectric and metal foil, such method being an improvement over prior art methods and particularly suited to the manufacture of capacitors having high volume efficiency, wherein the dielectric is formed from a thermally devitrifiable glass ceramic material characterized by an unusually high dielectric constant.

In the Glass Engineering Handbook, McGraw-Hill Book Company, Inc., New York 1958, E. B. Shand defines "glass ceramic" as follows: "A material melted and formed as a glass, then converted largely to a crystalline form by processes of controlled devitrification." The terms glassy state or vitreous state herein will be used to designate glass ceramic in the former condition defined by Shand. The terms devitrified state or crystalline state will be used to designate glass ceramic in the latter condition defined by Shand.

Such materials are described, and their use as capacitor dielectrics taught, by Andrew Herczog and S. Donald Stookey in patent application Ser. No. 378,468 filed June 26, 1964, now U.S. Pat. No. 3,195,030 and assigned to the assignee of the present invention. Representative compositions are shown in the above-identified application, and include the barium titanates, lead-barium-strontium niobates and the like. Such compositions may be broadly described as members of the family of oxygen-octahedra ferroelectric compounds containing at least one glass forming oxide, and may be employed to make ceramic capacitors having a high dielectric constant, and a high volume efficiency.

Dielectric constant, K, is considered to be high when values of 50 or so are exceeded. Capacitors having glass ceramic dielectrics of the type described possess the desirable attributes of small size, and large capacitance value for their size, which is a qualitative definition of volume efficiency. A more quantitative definition is the capacitance per unit volume of a capacitor.

As a rule, glass ceramics of the type described by Herczog and Stookey soften without crystallization at about 10°–50° C., or more, below the temperature at which crystallization begins. This permits sealing one piece of such material to another without crystallizing them. Such glass ceramics are particularly well suited for making thin glass strips adaptable for the dielectric laminations of stacked capacitors, for which purpose such strips may be laminated with metal foil strips or filmed with an electrically conductive coating, before being laminated. The vitreous state glass ceramic strips and metal strips are then sealed together, under pressure, embedding the metal foil laminations in the glass, whereafter the glass is devitrified, forming a monolithic structure.

It has been discovered that the T.V.C. value of a capacitor incorporating a glass ceramic dielectric of the type described may be lowered by quickly heating the glass ceramic to its devitrifying temperature during the capacitor manufacturing process. T.V.C., or temperature-plus-voltage-characteristic may be defined as the percent change in K of a capacitor at some temperature other than room temperature and under an applied rated voltage, from its K at room temperature and under no applied voltage. It has also been discovered that high dielectric constants are obtainable by heating these glass ceramics to as high a devitrifying temperature as practicable. Thus, to a considerable extent, the T.V.C. and K of the capacitors produced from these glass ceramic materials may be "tailored" to desired values during capacitor manufacture by an appropriate choice of thermal processing parameters.

It has long been recognized by practitioners of the laminated capacitor manufacturing art that an appropriate and timely application of a pressing force to the laminations of a stacked capacitor has a beneficial effect on the production of an intimate, void-free bond therebetween. Such force is most efficaciously applied when the dielectric is in a soft and semi-fluid state. In capacitors made with glass ceramic dielectrics, however, the temperature range over which pressure may be advantageously utilized is limited. For example, a pressing force should not be applied to the laminations of a capacitor stack made with the glass ceramic dielectric materials described in the above-identified Herczog-Stookey application unless the laminations are at or above the softening temperature and below the lowest devitrification temperature thereof. Below the softening temperature, these materials are too rigid to press without danger of breakage, and at or above the lowest devitrification temperature such materials crystallize with an abrupt or rapidly increasing change of viscosity, making the pressing force ineffective. It has therefore been the practice of persons skilled in the art to employ a separate and distinct sealing and bonding process step when making capacitors from the above-mentioned materials, in order to better control the softening, flow and sealing thereof. It has been discovered, however, that failures of the dielectric and foil still occur, despite these extra precautions, rendering the capacitors unuseable. Such failures, unfortunately, do not usually manifest themselves until electrical testing of finished capacitors is under way. Careful examination of failed capacitors reveals cracks and breaks in the dielectric and, often, damage to the foil. All other, heretofore useful, methods, steps and procedures for making capacitors of the stacked or laminated type have been ineffective in preventing the failure of, or producing useable capacitors from, these potentially useful glass ceramic materials. Thus, it has been impossible to utilize, in any practical manner, the unusual and desirable physical and electrical properties of these glass ceramics for the manufacture of capacitors.

It is therefore an object of the present invention to provide a method for making glass ceramic and metal foil stacked capacitors, free from the defects and problems hereinabove described.

Another object of the present invention is to provide a method for making glass ceramic and metal foil stacked capacitors possessing the advantages of high dielectric constant and high volume efficiency.

A further object of the present invention is to provide a method for making capacitors which embody the useful advantages and inherent properties of a thermally devitrifiable glass ceramic material selected from the family of oxygen-octahedra ferroelectric compounds containing at least one glass forming oxide.

These, together with other objects, features and advantages of the present invention will be more apparent from the following detailed description and drawings.

The present invention is a method for making small, stacked electrical capacitors having a high dielectric constant and a high volume efficiency, comprising the steps of assembling a stack of electrically conductive material and vitreous state glass ceramic strips in an alternating relationship; forming a sealing assembly by disposing the stack intermediate layers of thermal insulating material arranged adjacent the pressing surfaces of a pair of pressing platens; heating the sealing assembly to the softening temperature of said vitreous state glass ceramic, but below the devitrifying temperature thereof; simultaneously applying a pressure to said stack, by means of said platens, to fuse the softened glass ceramic strips together and to embed the electrically conductive material therein; heating the sealing assembly to a temperature sufficient to devitrify the glass ceramic and maintaining said pressure and temperature until devitrification of said glass ceramic is completed; cooling said sealing assembly to room temperature; removing said pressure; removing the fused stack from said sealing assembly; and severing individual capacitors from the fused stack.

FIGURE 2 is a flow diagram illustrating the process steps for making a stacked capacitor.

Figure 1:
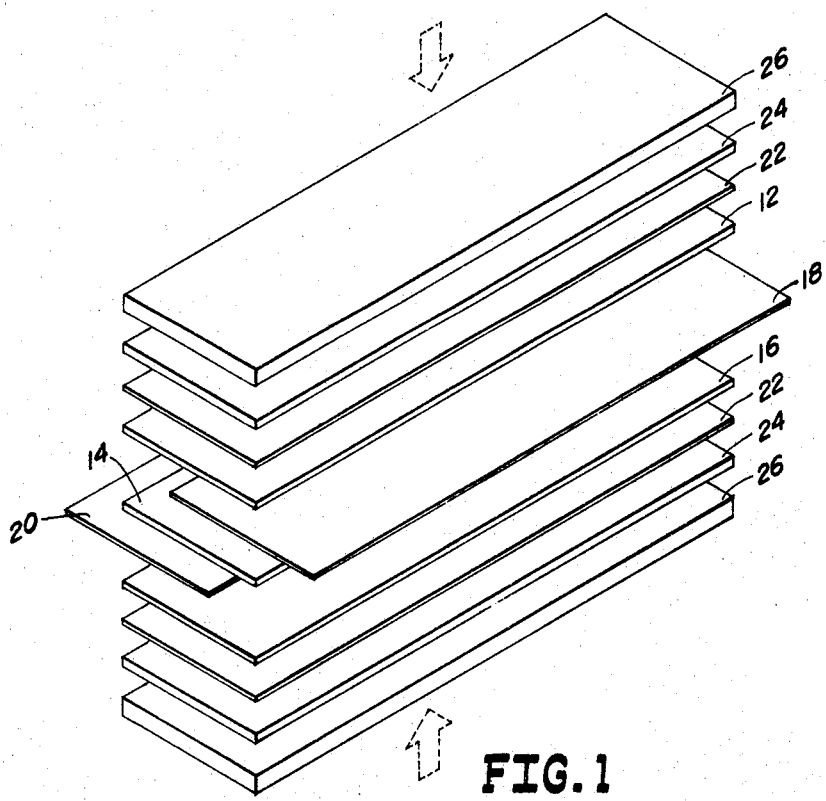
FIGURE 1 is an exploded perspective view of the components which comprise a sealing assembly, prior to thermal processing.

In FIGURE 1 dielectric strips 12, 14 and 16 are arranged in alternating relationship with foil strips 18 and 20 to form a stack. During assembly it may be advantageous to employ some method or means for holding the laminations together. A suitable means is a jig to contain the various strips and maintain them in alignment. A preferred method is coating the various strips with an adhesive binder during assembly, which securely but temporarily adheres them to each other. Upon subsequent thermal treatment the binder volatilizes, leaving no harmful residue. It has been found beneficial during capacitor assembly to avoid touching the strips of foil and dielectric with bare fingers. Strips may be handled with tweezers or with fingers protected by light cotton gloves or rubber finger cots. Insulating layers 22 and 24 physically separate and thermally insulate the stack from pressing platens 26. Layers 22 are ordinarily made from a thin, hard, smooth, heat resistant material such as mica, while layers 24 are usually made from a thin, resilient, heat resistant material such as asbestos paper, for example. These layers serve to prevent the dielectric material in the stack from adhering to the pressing platens during subsequent processing. The resilient layers additionally serve to distribute a pressing force more evenly over the surface of the dielectric strips. When the dielectric strips are uniformly flat and smooth, it is possible to eliminate layers 24 entirely. Two mica layers and up to four asbestos layers have been used with success. The foil and dielectric strips, together with the mica and asbestos layers and the pressing platens, when assembled in a pile, comprise a sealing assembly. For clarity of illustration only three dielectric strips and two foil strips, and only four insulating layers and two pressing platens are shown in FIGURE 1.

The pressing platens may be made from any flat smooth, reasonably dense, heat resistant material. Such materials include stainless steel, dense refractory materials and the like.

The dielectric strips are preferably made from materials which may be broadly classified as oxygen-octahedra ferroelectric compounds containing at least one glass forming oxide, as previously mentioned. In the above-identified application of Herczóg and Stookey, it is taught that: "The compositions of Table VI, shown in cationic mol percent, contain the oxide components of a variety of ferroelectric compounds including one or more of: titanate of barium or cadmium, niobate of sodium or potassium or strontium or cadmium or barium or lead; zirconate of cadmium or barium or lead; tantalate of sodium or cadmium; ferrate of lead or lanthanum; germanate of iron; or oxide of tungsten, $WO_3$. Each of the glasses of Table VI, after being heat treated, will contain one or more of such high permittivity (designated Hi Perm) crystal phases; the most probable phases are indicated for the respective compositions." Reproduced herein as Table I are two exemplary compositions, 86 and 88, taken from Table VI of the Herczóg-Stookey application, which illustrate lead-barium-strontium niobate ferroelectric compounds. It will be noted that the dielectric constant of these two exemplary materials are greatly different, although both are high, illustrative of the wide range of dielectric constants which may be obtained through composition variations.

TABLE I

|  | 86 | 88 |
| --- | --- | --- |
| $NbO_{2.5}$ | 34.0 | 39.6 |
| $BaO$ | 11.1 | 10.4 |
| $PbO$ | 12.5 | 10.2 |
| $SrO$ | 10.5 | 8.8 |
| $AlO_{1.5}$ | 16.2 | 2.3 |
| $BO$ |  | 11.6 |
| $SiO_2$ | 15.7 | 17.1 |
| $F_2$ | 2.0 |  |
| ° C.[1] | 1,000 | 1,000 |
| K[2] | 148 | 1,200 |
| Hi Perm | Ba .5 $NbO_3$ | Ba .5 $NbO_3$ |
| Crystal Phases | Sr .5 $NbO_3$ | Sr .5 $NbO_3$ |
|  | Pb .5 $NbO_3$ | Pb .5 $NbO_3$ |
|  | BaNbO 3.5 | BaNbO 3.5 |
|  | SrNbO 3.5 | SrNbO 3.5 |
|  | PbNbO 3.5 | PbNbO 3.5 |

[1] ° C. in this table refers to the devitrifying temperature used to prepare the sample.
[2] K refers to the dielectric constant of the sample.

While any of the hereinabove identified compositions are amenable to the method of the present application, a particularly suitable composition of the lead-barium-strontium niobate type has been selected for a typical example, and will be described later, in more detail. Such an example is not in any way intended to be limitative, but only illustrative, of the present invention, serving to indicate a composition which has been found, among others, suitable for processing into practical, useful capacitors by the method of the present invention.

Referring again to FIGURE 1, the dielectric strips are shown as being very thin compared to their length and width. An exemplary but not limitative ratio of thickness to width being about one to one hundred fifty.

The capacitor plates or electrodes are herein illustrated as thin foil strips 18 and 20. They may also be made from thin films of highly conductive material deposited by any of several well known methods on at least one surface of each dielectric strip. Suitable materials for the foil strips and conductive films are noble metals such as silver, gold, platinum, and the like. Although conductive leads for capacitors made in accordance with the present invention are not shown, it will be recognized by one skilled in the art that leads may be provided by any of several well known methods. For example, leads for single layer capacitors may be soldered to portions of electrodes left exposed for this purpose. In multi-layer capacitors employing a plurality of electrodes, the ends of the capacitors are ground off slightly, exposing the edges of the foil strip electrodes. Silver paint is fired onto the area so exposed. Conductive leads are then soldered to the metallic silver which remains after the paint is fired.

Referring to FIGURE 2, after the sealing assembly is formed as set forth in conjunction with the description of FIGURE 1, it is subjected to a series of process steps which converts the stack into a unitary, monolithic capacitor structure. This is accomplished by heating the sealing assembly to the softening temperature of the vitreous state glass ceramic, but below the devitrifying temperature thereof. For the compositions herein described, such a temperature will be above 500° and below 750° C. A pressing force is gradually applied to the pressing platens while the sealing assembly is being heated, such force ultimately being capable of producing sufficient pressure on the softened laminations to fuse them together and embed the foil strips therein. It is preferred to gradually apply the pressing force over a period of about five minutes or so at a temperature close to the softening temperature of the vitreous state glass ceramic material; otherwise, the dielectric strips may break. The sealing assembly is then heated to the devitrifying temperature of the glass ceramic, but below the melting temperature of the electrode material. Such a temperature will be between about 750° and 1050° C. for the materials hereinabove described. The stack is maintained under pressure at the devitrifying temperature of its glass-ceramic dielectric material, until devitrification is completed. The length of time required to devitrify these materials will depend upon the particular temperature chosen. It is typical of glass ceramic materials in general that the rate of devitrification is proportional to temperature. The length of time further depends on the particular dielectric constant desired, since it is temperature dependent. Devitrification time may be varied between a few minutes at 1050° C. for example, to several hours or more at 750° C. The rate of heating the stack from softening temperature to devitrifying temperature will be determined by the particular T.V.C. desired for the finished capacitor. In general, such a rate will lie between about 300° and 1500° C. per hour.

After devitrification is complete, the sealing assembly is allowed to cool to room temperature, after which the pressing force may be removed from the platens. The rate of cooling will also, to some extent, affect the ultimate T.V.C. of the finished capacitor, and thus is intentionally controlled to a value within the range of about 300° and 3000° C. per hour.

The sealing assembly is then disassembled and the fused unitary, monolithic capacitor stack is removed therefrom; this will be in the form of a thin, elongated narrow strip.

Individual capacitors are then severed from the strip by any of several well known methods which include sawing, shock cutting, scoring and breaking and the like. The removed portions, representing individual capacitors, are severed by cutting the strip in a direction transverse the longitudinal axis thereof. It is obvious that a plurality of individual capacitors may be removed from a single strip, if desired. The value of capacitance for each capacitor being finally determined by the width of the removed portion.

Figure 3:
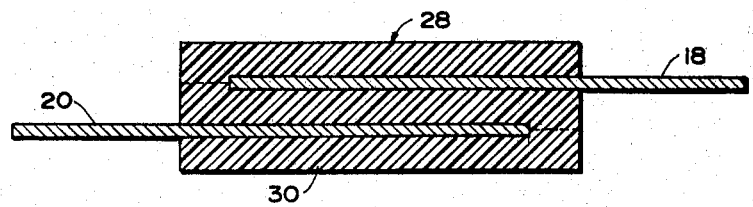
FIGURE 3 is a cross sectional view of a stacked capacitor after thermal processing.

In FIGURE 3 a cross sectional view of capacitor 28 illustrates the appearance of a stacked capacitor after thermal processing by the method of the present invention. Foil strips 18 and 20 are embedded in glass ceramic body 30 which is now in the crystalline state, and are sealed thereto. The phantom lines illustrate the former surfaces of the dielectric strips shown in FIGURE 1, which were present at the time of assembly, but are now fused into a solid, monolithic, structure.

The present invention may be more clearly understood from the presentation of a typical example which is intended to illustrate, but not limit, certain specific methods, steps, materials, values and features thereof, which have been employed to provide useful capacitors of the type described.

Strips of vitreous state glass ceramic consisting essentially of $Nb_2O_5$—47.7%, PbO—18%, BaO—13%, SrO—9%, $SiO_2$—8%, $Al_2O_3$—2%, $B_2O_3$—2%, and $Cu_2O$—0.3%, by weight, are preformed to a thickness of about .0015", a width of about .250", and a length of up to several inches. Twenty-nine such strips are alternately stacked with twenty-eight strips of gold foil, each having a thickness of about .00025", and a length and width corresponding to the dielectric strips. As the strips are assembled, each is coated with melted bi-phenyl, a commercial product of Eastman Organic Chemicals, obtainable through Distillation Products Industries, Rochester, N.Y. Bi-phenyl is an organic chemical compound having the formula $C_6H_5C_6H_5$. Hard and wax-like at room temperature, bi-phenyl melts at low temperatures, providing an adhesive binder particularly well suited to hold the laminations together. Upon subsequent heating to glass working temperatures, bi-phenyl volatilizes, leaving no residue. The assembled strips form a stack. A layer of mica, several thousandths of an inch thick is placed on the top and bottom of the stack. Two layers of .016" asbestos paper are placed adjacent each mica layer. Both mica and asbestos layers are slightly larger than the dielectric and foil strips, overlapping them. A stainless steel pressing platen having a thickness of about .125" and a length of 6" and width of 4" is placed over the outermost asbestos layer at the top of the stack and another, similar, platen is placed over the outermost asbestos layer at the bottom of the stack. The assemblage of platens, strips and layers is called a sealing assembly. The sealing assembly is placed into a suitable furnace at room temperature; said furnace having force applying means mounted therein, such means adapted to receive the sealing assembly and to apply a pressing force to the platens thereof. Suitable temperature sensors are placed in contact with the sealing assembly, and with the stack contained therein, so that processing temperatures for the glass ceramic may be accurately controlled. The temperature of the stack is raised to about 620° C. at the rate of about 300° C. per hour and maintained for about ½ hour, after which the temperature of the stack is increased to about 680° C., and a pressing force is gradually applied to the platens over a period of five minutes until a pressure of about 200 p.s.i. is reached. During the heating period, the bi-phenyl binder has volatilized, leaving no residue. The strips of vitreous state glass ceramic material soften and flow under the effect of heat and pressure, securely bonding to each other and to the gold foil electrodes, embedding them, and forming an essentially unitary structure. The sealing assembly is then raised to a temperature of about 950° C. at the rate of 300° C. per hour, and the pressure is reduced to about 50 p.s.i. This pressure and temperature is maintained for 2½ hours, after which the furnace is shut off, allowing the sealing assembly to cool at about 300° C. per hour. When the sealing assembly reaches room temperature, the remaining pressure is released from the platens, and the stack removed from the sealing assembly. The stack, now in the form of an elongated strip about .250" wide, about .064" thick and several inches long, is placed in a diamond gang saw and transversely sliced into a plurality of .064" wide segments, each such segment being a capacitor.

It may be pointed out that when devitrifying temperatures above about 950° or so are employed, the pressing force may be reduced, as hereinabove discussed; whereas, when devitrifying temperatures between about 750° and 950° C. are utilized, the original pressing force is maintained.

What is claimed is:

1. A method for making small, stacked electrical capacitors having high dielectric strength and high volume efficiency comprising the steps of:

assembling a stack of electrically conductive material and vitreous state glass ceramic strips in an alternating relationship,
   said glass ceramic strip material being selected from a family of oxygen-octahedra ferroelectric compounds comprising at least one of: barium titanate, cadmium titanate, sodium niobate, potassium niobate, strontium niobate, cadmium niobate, barium niobate, lead niobate, cadmium zirconate, barium zirconate, lead zirconate, sodium tantalate, cadmium tantalate, lead ferrate, lanthanum ferrate, iron germanate, and tungsten oxide; and at least one glass forming oxide,
forming a sealing assembly by disposing said stack intermediate two layers of thermal insulating material arranged adjacent the pressing surfaces of a pair of pressing platens,
heating the sealing assembly to the softening temperature of said vitreous state glass ceramic but below the devitrifying temperature thereof,
simultaneously applying a pressure to said stack by means of said platens to fuse the softened vitreous state glass ceramic strips together and to embed the electrically conductive material therein,
heating the sealing assembly to a temperature in excess of about 10° C. above the softening temperature of said vitreous state glass ceramic to begin devitrification thereof,
maintaining said pressure and temperature for a period of time sufficient to cause devitrification of said glass ceramic to a point at which it has a dielectric constant in excess of about 50,
cooling said sealing assembly to room temperature,
removing said pressure,
removing the fused stack from said sealing assembly, and
severing individual capacitors from the fused stack.

2. The method of claim 1 wherein said glass ceramic material has a softening temperature above 500° C. and below 750° C. in the vitreous state, and a devitrifying temperature above 750° C.

3. The method of claim 2 wherein said glass ceramic material consists essentially by weight of 47.7% $Nb_2O_5$, 18% PbO, 13% BaO, 9% SrO, 8% $SiO_2$, 2% $Al_2O_3$, 2% $B_2O_3$, and 0.3% $Cu_2O$.

4. The method of claim 1 wherein said electrically conductive material is a noble metal foil.

5. The method of claim 1 wherein said electrically conductive material is a noble metal film deposited on at least one surface of each of said dielectric strips.

6. The method of making small, stacked electrical capacitors having high dielectric strength comprising the steps of:
   arranging alternate strips of gold foil and a vitreous state glass ceramic dielectric material to form a stack,
   said glass ceramic strip material being selected from a family of oxygen-octahedra ferroelectric compounds comprising at least one of: barium titanate, cadmium titanate, sodium niobate, potassium niobate, strontium niobate, cadmium niobate, barium niobate, lead niobate, cadmium zirconate, barium zirconate, lead zirconate, sodium tantalate, cadmium tantalate, lead ferrate, lanthanum ferrate, iron germanate, and tungsten oxide; and at least one glass forming oxide,
   said glass ceramic further having a softening temperature above 550° C. and below 750° C. in the vitreous state, and a minimum devitrifying temperature of about 750° C.,
inserting said stack between a pair of mica layers and a pair of pressing platens, to form a sealing assembly,
heating said sealing assembly at a rate of at least 300° C. per hour to a temperature of about 680° C.
simultaneously applying a gradually increasing pressing force to said platens for a period of about 5 minutes until a pressure on the sealing assembly of about 200 p.s.i. is reached, whereby the softened vitreous state glass ceramic strips are caused to fuse together and embed the strips of gold foil therebetween,
heating the sealing assembly at a rate between about 300° C. and 1500° C. per hour until the glass ceramic reaches a devitrifying temperature above 750° C. but below 1050° C.,
maintaining said pressure and said devitrifying temperature for a period of time sufficient to cause devitrification of said glass ceramic to a point at which it has a dielectric constant in excess of about 50,
cooling said sealing assembly at a rate between about 300° C. and 3000° C. per hour until room temperature is reached,
removing said pressure,
removing the fused stack from the sealing assembly, and
severing individual capacitors from said fused stack.

References Cited
UNITED STATES PATENTS

| | | | |
|---|---|---|---|
| 2,526,703 | 10/1950 | Smith | 65—24 XR |
| 3,235,939 | 2/1966 | Rodriguez et al. | |
| 3,292,234 | 12/1966 | Layton et al. | 65—59 XR |
| 3,310,392 | 3/1967 | Rhodes | 65—59 XR |
| 3,328,145 | 6/1967 | McMillan et al. | 65—59 XR |

FRANK W. MIGA, Primary Examiner

U.S. Cl. X.R.

29—25.42; 65—43, 59, 155; 106—52